(No Model.)
W. H. M. WEAVER.
TELEPHONE REPEATER.
No. 595,983. Patented Dec. 21, 1897.
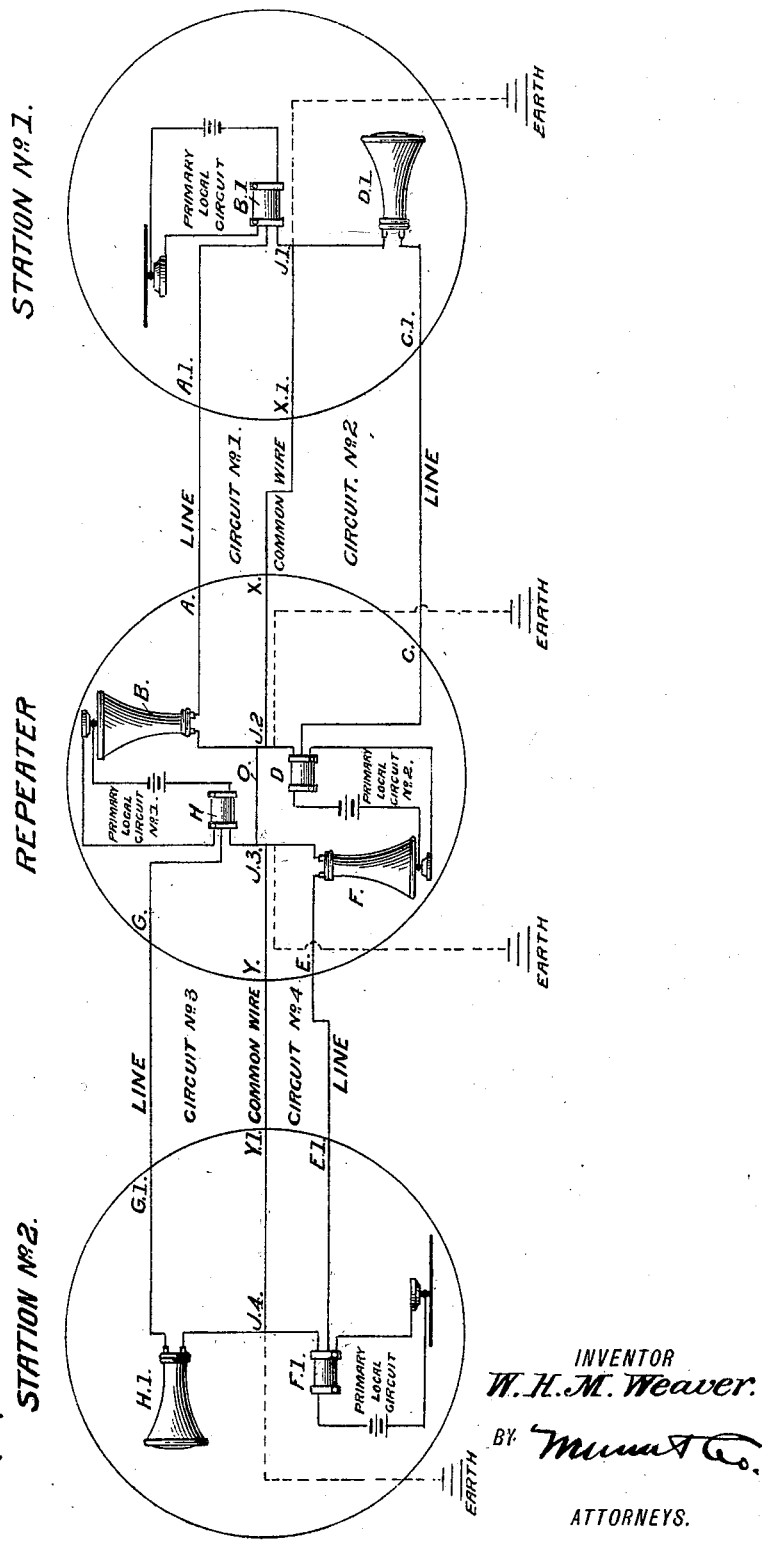
WITNESSES:
M. D. Bloudel
Edw. U. Byen.
INVENTOR
W. H. M. Weaver.
BY
ATTORNEYS.

UNITED STATES PATENT OFFICE.

WILLIAM H. M. WEAVER, OF MACON, GEORGIA.

TELEPHONE-REPEATER.

SPECIFICATION forming part of Letters Patent No. 595,983, dated December 21, 1897.

Application filed September 4, 1897. Serial No. 650,661. (No model.)

*To all whom it may concern:*

Be it known that I, WILLIAM H. M. WEAVER, of Macon, in the county of Bibb and State of Georgia, have invented a new and useful Improvement in Telephone-Repeaters, of which the following is a specification.

My invention is in the nature of a novel telephone-repeater for the transmission of telephonic sound-waves, either in the form of articulate speech or musical sounds, from one independent circuit to another or to several others.

My invention consists in the special arrangement of receivers and transmitters in connection with a common return-wire (or earth-circuit) forming four circuits, as will be hereinafter more fully described with reference to the drawing, which represents, diagrammatically, two stations and an intermediate repeater.

The diagram shows telephone-station No. 1 connected with one side of repeater by two lines and common return-wire or earth-circuit, or both, and telephone-station No. 2 connected with the other side of repeater by two lines and common return-wire or earth-circuit, or both. These instruments are arranged in such special relation to each other and to the common return-wire or earth-circuit, or both, that telephonic sound-waves are successfully repeated from one circuit to another or others.

Station No. 1 is equipped with transmitter B' and receiver D', connected as follows: Line-wire comes into this station at A' and passes through secondary wire of induction-coil of transmitter B', thence through coil of receiver D', passing out of this station at C'. A special common return-wire or earth-circuit, either or both, is joined to a point in line between transmitter B' and receiver D' designated as J'. This common wire runs from J' to X', and thence to the repeater, hereinafter described. The earth-circuit, which is the equivalent or supplement of this common return-wire, runs from J' to the earth, as shown in dotted lines.

Station No. 2 is equipped with receiver H' and transmitter F', connected as follows: Line-wire comes in at G' and passes through coil of receiver H', thence through secondary coil of transmitter F', going to line again at E'. A special common return-wire or earth-circuit is joined to a point in line between receiver H' and transmitter F' designated as $J^4$. This common return-wire runs from $J^4$ to Y', and thence to the repeater. The earth-circuit runs from $J^4$ to earth, as shown by the dotted lines. The repeater is equipped with receiver B, induction-coil D, induction-coil H, and receiver F, in connection with two separate main circuits and two local battery (primary) circuits, as shown.

*First main circuit.*—Line-wire comes in at A and passes through coil of receiver B, thence through secondary coil of induction-coil D, and goes out at C. A special common return-wire or earth-circuit, either or both, is joined to a point in line designated as $J^2$. This common return-wire runs from $J^2$ to X, and thence to station No. 1. The earth-circuit, which may be used in the place of return-wire, runs from $J^2$ to earth, as shown by dotted lines.

*Second main circuit.*—Line-wire comes in at G and passes through secondary circuit of induction-coil H, thence through coil of receiver F, going out again at E. A special common return-wire or earth-circuit is joined to a point in line designated as $J^3$. This common return-wire runs from $J^3$ to Y, and thence to station No. 2. The earth-circuit, when used, runs from $J^3$ to earth, as shown by dotted lines.

*Local circuit No. 1.*—A platinum point pressed on diaphragm of receiver B by a carbon button (or a granular carbon button cut in circuit instead) completes primary local circuit through battery and primary wire of induction-coil H.

*Local circuit No. 2.*—A platinum point pressed on diaphragm of receiver F by a carbon button (or a granular carbon button cut in circuit instead) completes primary local circuit through battery and primary wire of induction-coil D.

*Connections.*—Connect transmitter B' on station No. 1 with repeater by connecting line at A' on station No. 1 with A on repeater and common return at X on repeater with X' on station No. 1. This completes circuit No. 1. Connect receiver H' on station No. 2 with repeater by connecting line at G' on station No. 2 with G on repeater and common return at Y' on station No. 2 with Y on repeater. This completes circuit No. 3. This completes two separate circuits—i. e., circuits No. 1 and No. 3. Now if sounds are made in transmitter B' in circuit No. 1 they are communicated to receiver H' in circuit No. 3 through sympathetic action of receiver B and induction-coil H. So far this arrangement reproduces or repeats sounds in one direction only from one circuit to another. Connect transmitter F', station No. 2, with repeater by connecting line at E' on station No. 2 with E on repeater, and as the common return is already connected this completes circuit No. 4. Connect receiver D', station No. 1, with repeater by connecting line at C' on station No. 1 with C on repeater, and as the common return is already connected this completes circuit No. 2, making four independent main circuits. Now if sounds are made in transmitter F' in circuit No. 4 they are communicated to receiver D' in circuit No. 2 through sympathetic action of receiver F and induction-coil D. This arrangement, it will be seen, repeats in both directions, using four independent circuits, no circuit interfering with work required of any other circuit.

The earth connections may be used either in conjunction with or in lieu of common return-wire. Common return-wire may be run from station to station, connecting with lines on repeater at points designated as $J^2$ and $J^3$, as shown at O.

The arrangement of instruments and circuits as shown in no way militates against the use of such lines for short distances from place to place where repeater is not necessary. Thus, for instance, remove repeater, connect line A to line G, connect return-wire X to Y, and connect C to E. Then sounds made in transmitter B' are communicated to receiver H' and sounds made in transmitter F' are communicated to receiver D'. In this case the common return may be disconnected and the circuit becomes an ordinary metallic circuit.

With reference to the value of the common return-wire I would state that if it is attempted to transmit sound-waves from one of these circuits to the other without the common return-wire or earth-circuit the two receivers on the repeater act on each other, causing a ringing or humming sound at both ends of the circuit, which under these circumstances renders such form of repeater worthless. By the addition of the common return-wire or earth-circuit and the arrangement of instrument and circuits shown this disturbance is entirely eliminated.

The advantages of my invention are as follows:

On long-distance work the cost of building lines is greatly reduced, as smaller and cheaper wire or iron wire instead of copper may be used and the same efficiency maintained, since the repeaters can be cut in circuit at intervals.

By the use of repeaters in telephone-exchanges all the batteries may be maintained in central station by using magneto-transmitters on subscriber's station, doing away with local batteries and preserving efficiency.

By wiring and connecting the instruments, as shown, in relation to each other and to common return-wires or earth connections this gives two complete circuits of each metallic circuit with common return or earth wires, or both, as one side of each divided circuit, and in doing this I secure perfect unison of action between instruments on one circuit, (divided circuit,) which in turn acts on the instruments of corresponding circuit, (divided circuit,) which acts in corresponding unison. In this arrangement the instruments on one side of circuit (divided circuit) has no disturbing influence on instruments on other divided circuit of same metallic circuit.

By connecting repeater with local instruments in halls or other public places, mounting apparatus on proper sounding-boards, with the aid of proper cone, entertainments, operas, speeches, &c., may be listened to by whole audiences between cities.

Having thus described my invention, what I claim as new, and desire to secure by Letters Patent, is—

A telephone-repeater comprising two or more stations each equipped with a receiver and an induction-coil transmitter, intermediate repeating devices comprising two receivers and two induction-coils with their primary wires extended to and provided with contact devices operated by the diaphragms of the said receivers of the repeating devices, each receiver and induction-coil of the repeating devices being in the main-line circuit of one station and a common return-circuit connecting the main circuit at each station at a point between its receiver and transmitter, with the main circuit between the receivers and induction-coils of the repeating devices and also connecting the main circuits between the receiver and induction-coil of one side of the repeating devices with the main circuit between the receiver and induction-coil on the other side of the repeating devices substantially as and for the purpose described.

WILLIAM H. M. WEAVER.

Witnesses:
    THOS. H. OTLEY,
    BRADFORD E. PALMER.